(12) United States Patent
Kim et al.

(10) Patent No.: US 8,314,902 B2
(45) Date of Patent: Nov. 20, 2012

(54) TRANSPARENT DISPLAY DEVICE

(75) Inventors: Eung-Do Kim, Gyeonggi-Do (KR);
Se-Hong Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 161 days.

(21) Appl. No.: 12/967,416

(22) Filed: Dec. 14, 2010

(65) Prior Publication Data

US 2011/0141399 A1 Jun. 16, 2011

(30) Foreign Application Priority Data

Dec. 15, 2009 (KR) .......................... 10-2009-0125066

(51) Int. Cl.
*G02F 1/1335* (2006.01)
*F21V 7/04* (2006.01)

(52) U.S. Cl. ................ 349/96; 349/62; 349/64; 349/65; 362/606; 362/607

(58) Field of Classification Search ............. 349/62, 349/64–65, 96; 362/606–607
See application file for complete search history.

(56) References Cited

U.S. PATENT DOCUMENTS

2009/0257001 A1 * 10/2009 Sumida et al. ................... 349/65

* cited by examiner

*Primary Examiner* — Nathanael R Briggs
(74) *Attorney, Agent, or Firm* — McKenna Long & Aldridge, LLP

(57) ABSTRACT

Disclosed is a transparent display device that includes a LCD panel; a light source at one side of a lower portion of the LCD panel to emit light; a first polarizing plate polarizing light emitted from the light source; a light guide plate at a lower portion of the LCD panel to totally reflect the light polarized to an axis by the first polarizing plate to a lateral surface and supply to the LCD panel, and transmit natural light from a lower direction; a second polarizing plate at an upper portion of the LCD panel to control the amount of polarized light passing through the LCD panel; and an optical sheet at a lower portion of the light guide plate to change the polarized state of a first polarized light from the light guide plate and reflect the light, and transmit a second polarized component from the lower portion therethrough.

9 Claims, 2 Drawing Sheets

TRANSPARENT DISPLAY DEVICE

CROSS-REFERENCE TO RELATED APPLICATIONS

This application claims the benefit of of earlier filing date and right of priority to Korean Application No. 10-2009-0125066 filed on Dec. 15, 2009, the contents of which is incorporated by reference herein in its entirety.

BACKGROUND OF THE INVENTION

1. Field of the Invention

The present invention relates to a transparent display device, and more particularly, to a transparent display device in which luminance in an image mode is enhanced.

2. Description of the Related Art

In recent years, with rising interests in information displays and increasing demands to use portable information media, researches and commercialization of light-weight and thin-profile flat panel displays (FPDs) for substituting traditional displays such as cathode ray tubes (CRTs) have been actively carried out. In particular, among such FPDs, a liquid crystal display (LCD), which is a device displaying images using an optical anisotropy of liquid crystal molecules, has been actively applied to a notebook, a desktop monitor, or the like, because it is excellent in the resolution, color representation, image quality, and the like.

On the other hand, studies on a transparent display device for allowing rear objects thereof to be seen as well as capable of implementing images thereon have been actively carried out. Such a transparent display device may be applicable to vehicle front glasses or house glasses to provide the user's desired information. Therefore, the applicability of such transparent display devices may be expected to be drastically increased.

In general, it may be used an organic light-emitting display device and the like using spontaneous light for the transparent display device.

However, in case of the organic light-emitting display device, a display device thereof can be made only to be transparent, and thus it may be impossible to turn on or off the transparency to make it transparent or implement an image thereon. Also, there are various problems such as low yield, difficulty in making a large-sized display, low reliability, and the like.

As a result, it may be required to develop a liquid crystal display device capable of implementing high yield, large-sized displays, high reliability, as well as capable of implementing wide viewing angle, high luminance, high contrast ratio and full color as a transparent display device, but the liquid crystal display device cannot be used as a transparent display device. However, the liquid crystal display cannot spontaneously emit light but implement an image by using light of the backlight because a non-transparent backlight unit should be provided at a rear surface of the liquid crystal display panel and also polarizing plates should be provided at both front and rear surfaces of the liquid crystal display panel, respectively, to control the transmission of light. In particular, the polarizing plates provided at both front and rear surfaces of the liquid crystal display panel, respectively, allows light to be transmitted therethrough when liquid crystals are driven in the liquid crystal display panel, but light is in a non-transparent state when liquid crystals are not driven, and thus it is impossible to implement a transparent display.

SUMMARY OF THE INVENTION

The present invention is contrived to solve the aforementioned problem and an object of the invention is to provide a transparent display allowing a user to view an object at a rear surface of the display device.

Another object of the present invention is to provide a transparent display device in which an optical sheet is provided at a lower portion of a light guide plate to reflect light exited from the light guide plate and supply to a liquid crystal display panel again, thereby enhancing luminance in an image mode.

In order to accomplish the foregoing object, a transparent display device according to the present invention may include a liquid crystal display panel; a light source disposed at one side of a lower portion of the liquid crystal display panel to emit light; a first polarizing plate for polarizing the light emitted from the light source; a light guide plate disposed at a lower portion of the liquid crystal display panel to reflect totally the light polarized in an axis-direction by the first polarizing plate to a lateral surface of the light guide plate to supply the light into the liquid crystal display panel, and transmit natural light entered from a lower direction therethrough; a second polarizing plate disposed at an upper portion of the liquid crystal display panel to control the amount of polarized light passing through the liquid crystal display panel; and an optical sheet disposed at a lower portion of the light guide plate to change the polarized state of a first polarized light entered from the light guide plate and reflect the light, and transmit a second polarized component entered from the lower portion therethrough.

The optical sheet may include a first base film and a second base film, and a polarizing portion disposed between the first base film and the second base film to polarize incident light in a first polarization direction and output the light, and change light having a second polarized component to light having a first polarized component and output the light, and the polarizing portion may be formed with several hundred sheets of an isotropic medium and an anisotropic medium having a birefringence characteristic to transmit a P-wave component and reflect a S-wave component among the incident light.

The optical sheet may further include a diffusion film disposed at an upper portion of the first protective film to diffuse light entered from the polarizing portion.

According to the present invention, an optical sheet is provided at a lower portion of the light guide plate to reflect light outputted from the light guide plate to the lower portion and supply the reflected light to a liquid crystal display panel again, thereby enhancing the luminance of a display device in an image mode.

In addition, according to the present invention, the optical sheet is provided with a diffusion film to diffuse light reflected at the optical sheet to be supplied to the liquid crystal display panel, thereby enhancing the viewing angle characteristic of a display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the present invention will be described in detail with reference to the accompanying drawings.

According to the present invention, there is provided a transparent display device. In other words, according to the present invention, there is provided a display device allowing the user to view an object at a rear surface of the display device. At this time, an object at a rear surface of the display device may be not only displayed by applying a signal, but also the user's desired image may be also displayed on the transparent display device.

Moreover, according to the present invention, there is provided a transparent display device capable of enhancing luminance in an image mode in which an image is implemented on the display device. For this purpose, according to the present invention, an optical sheet is provided at a lower portion of the light guide plate to reflect light exited from the light guide plate to the lower portion and supply the reflected light to the light guide plate again, thereby enhancing luminance. At this time, in a transparent mode, the light supplied from a lower portion of the light guide plate to the light guide plate is passed through the optical sheet and supplied to a liquid crystal display panel, thereby allowing a user to view an object at the rear surface.

Figure 1:
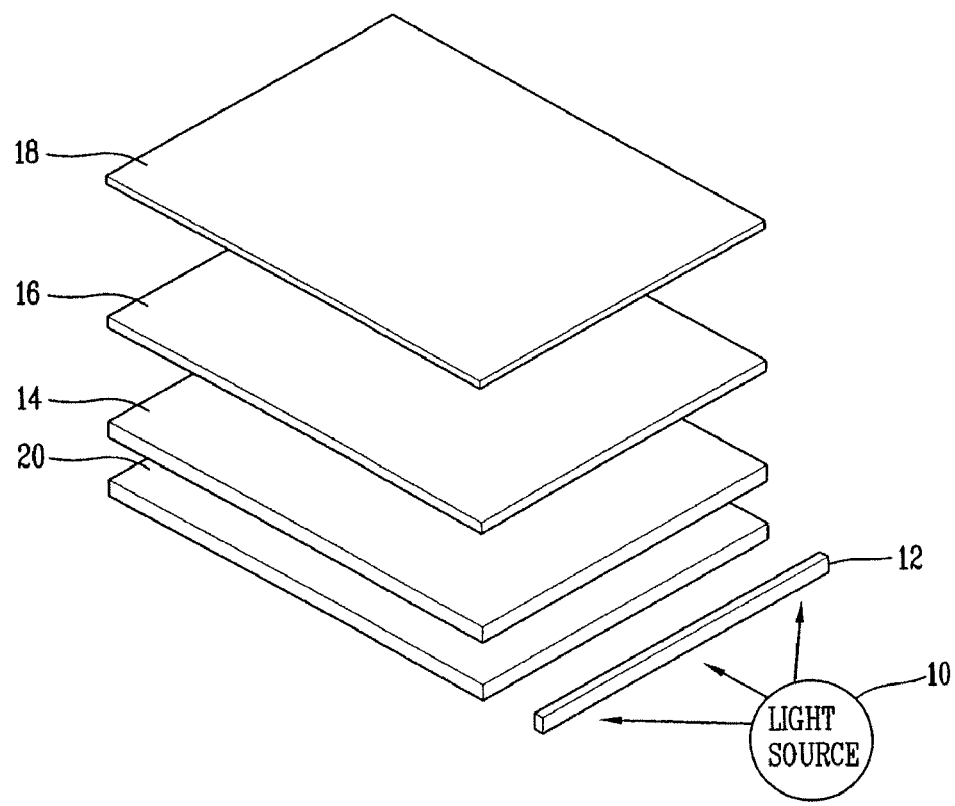
FIG. 1 is a view illustrating the structure of a transparent display device according to the present invention.

FIG. 1 is a view illustrating the structure of a transparent display device 1 according to a first embodiment of the present invention.

As illustrated in FIG. 1, a transparent display device 1 according to the present invention may include a liquid crystal display panel 16, a light guide plate 14 disposed at a lower portion of the liquid crystal display panel 16 to guide light to the liquid crystal display panel 16, a light source 10 disposed at a lateral surface of the light guide plate 14 to emit light to the light guide plate 14, a first polarizing plate 12 disposed between the light source 10 and a lateral surface of the light guide plate 14 to polarize the light emitted from the light source to enter into the light guide plate 14, a second polarizing plate 18 disposed at an upper portion of the liquid crystal display panel 16 to polarize light transmitting through the liquid crystal display panel 16, and an optical sheet 20 disposed at a lower portion of the liquid crystal display panel 16.

Though not shown in the drawing, the liquid crystal display panel 16 may include a thin-film transistor array substrate and a color filter substrate, and a liquid crystal layer therebetween, thereby implementing an image when a signal is applied from the outside. The thin-film transistor array substrate is formed with a plurality of gate lines and data lines vertically and horizontally arranged to define a plurality of pixel regions, and each pixel region is formed with a thin-film transistor which is a switching device, and formed with a pixel electrode formed on the pixel region. In addition, the thin-film transistor may include a gate electrode connected to the gate line, a semiconductor layer formed by depositing amorphous silicon or the like on the gate electrode, and a source electrode and a drain electrode formed on the semiconductor layer and connected to the data line and pixel electrode.

The color filter substrate may include a color filter (C) configured with a plurality of sub-color filters for implementing red (R), green (G), and blue (B) colors, and a black matrix for dividing between the sub-color filters and blocking light passing through the liquid crystal layer.

The thin-film transistor array substrate and color filter substrate configured as described above are adhered by facing each other by a sealant (not shown) formed at an outside of the image display region to constitute a liquid crystal display panel, and the adhesion between the thin-film transistor array substrate and color filter substrate is achieved by an alignment key formed on the thin-film transistor array substrate and color filter substrate.

The light source 10 is disposed in a lateral direction of the light guide plate 14. For the light source 10, it may be used a fluorescent lamp such as a cold cathode fluorescence lamp (CCFL) or external electrode fluorescent lamp (EEFL), or a plurality of light emitting devices (LEDs). In case of using LEDs, it may be used an LED that emits monochromatic light such as red, green, blue, and the like or a white LED that emits white light.

The light emitted from the light source 10 may include a first polarized light (vertical polarized light) and a second polarized light (horizontal polarized light) as visible light. The first polarizing plate 12 may be adhered to a lateral portion of the light guide plate 14. The first polarizing plate 12 is allowed to transmit only a first polarized light among the light including the first polarized light and the second polarized light.

If the light emitted from the light source 10 is entered into the first polarizing plate 12, then a second polarized light component of the light is absorbed by the first polarizing plate 12 to transmit only a first polarized light through the first polarizing plate 12. The light guide plate 14 allows the first polarized light that has passed through the first polarizing plate 12 to be entered into the liquid crystal display panel 16 at an upper portion thereof.

Figure 2:
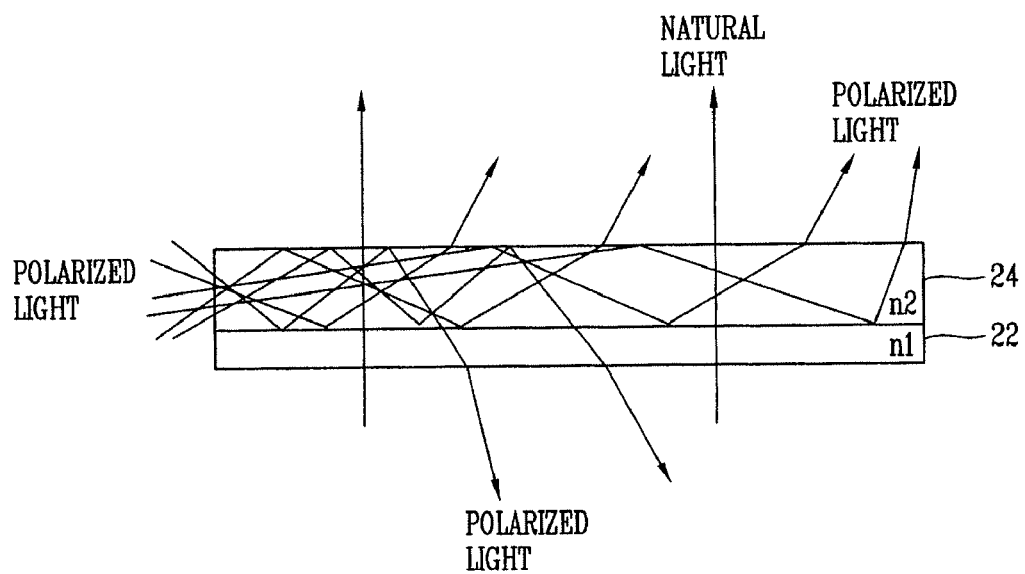
FIG. 2 is a view illustrating the total reflection of light in a light guide plate of a transparent display device according to the present invention.

As illustrated in FIG. 2, the light guide plate 14 may include a first refraction layer 22 and a second refraction layer 24.

The second refraction layer 24 is disposed to be adjacent to the liquid crystal display panel 16, and the first refraction layer 22 is disposed at a lower portion of the second refraction layer 24. In other words, the first refraction layer 22 is formed and then the second refraction layer 24 is formed thereon. The first refraction layer 22 is a material having a first refractive index (n1), and may be composed of fluorinated calcium ($CaF_2$) or fluorinated magnesium ($MgF_2$), and the like. At this time, the refractive index of fluorinated calcium ($CaF_2$) is 1.35 and the refractive index of fluorinated magnesium ($MgF_2$) is 1.38. The second refraction layer 24 is a medium having a second refractive index (n2), and may be composed of a high molecular substance, such as polymer methyl methacrylate, plastic, or glass. At this time, the second refractive index (n2) may be within a range of 1.49-1.50.

As described above, since the second refractive index (n2) is greater than the first refractive index (n1), the first polarized light entered to the light guide plate 14 is totally reflected at an interface between the first refraction layer 22 and the second refraction layer 24 and entered into the liquid crystal display panel 16 at an upper portion thereof. Total reflection is to reflect all light having an angle greater than the critical angle, and the critical angle ($\theta c$) may be determined by arcsin (n2/n1). Accordingly, the more the first refractive index (n1) is greater than the second refractive index (n2), the less the critical angle (θc) becomes, and thus the probability becomes higher that the first polarized light is totally reflected.

On the other hand, natural light is entered at a lower surface, i.e., from a lower direction. Natural light is passed through the first refraction layer 22 and second refraction layer 24 and entered into the liquid crystal display panel 16. The transparent liquid crystal display device according to the present invention may be in a transparent state by such natural light irrespective of displaying images. Accordingly, the user at the front of the display can see an object below the light guide plate.

The liquid crystal display panel 16 includes a liquid crystal layer, and thus liquid crystal molecules in the liquid crystal layer may be driven to change the phase of the first polarized light. The phase of the first polarized light that can be changed by driving liquid crystal molecules may be within a range of 0 to 90 degrees.

On the other hand, the light guide plate 14 is composed of a transparent material having a high optical transmissivity such acryl, epoxy, polymethyl methacrylate, and the like to guide incident light to the liquid crystal display panel 16. In other words, the light guide plate 14 may not be formed of a two-layered material having different refractive indices but may be formed of a single material. In this case, the total reflection of light entered into the light guide plate 14 is generated by a difference between the refractive index of the light guide plate 14 and the refractive index of air. In other words, in case where light is inputted from a lateral surface of the light guide plate 14 and entered to an interface between the light guide plate 14 and the air at a specific angle due to a difference between the refractive index of the light guide plate 14 (about 1.49 in case of polymethyl methacrylate which is typically used) and the refractive index of air (i.e., 1), the light polarized at the interface is totally reflected and supplied to the liquid crystal display panel 16.

Furthermore, in case where the light guide plate 14 is formed of a single material, a pattern may be formed at a lower surface of the light guide plate 14. The pattern 15 changes the incident angle of light entered into a lower surface of the light guide plate 14 to increase the ratio of light totally reflected at the interface between the light guide plate 14 and the air, thereby enhancing the luminance of light supplied to the liquid crystal display panel 16.

The optical sheet 20 is disposed at a lower portion of the light guide plate 14 to reflect light exited through a lower surface of the light guide plate 14 to be entered into the light guide plate 14 again. As illustrated in FIG. 2, light entered with an angle greater than the critical angle is not totally reflected at an interface between the first refraction layer 22 and the second refraction layer 24 but exited through a lower surface of the light guide plate 14. In this manner, the light exited through a lower surface of the light guide plate 14 is not supplied to the liquid crystal display panel 16, thereby causing the reduction of luminance in a transparent display device.

However, according to the present invention, the optical sheet 20 is disposed at a lower portion of the light guide plate 14 to reflect light exited through a lower surface of the light guide plate 14 to be entered into the light guide plate 14 again, and thus all light entered through a lateral surface of the light guide plate 14 is supplied to the liquid crystal display panel 16, thereby increasing the luminance of the liquid crystal display panel 16.

On the other hand, the optical sheet 20 allows natural light entered from a lower portion of the light guide plate 14 to be passed therethrough as it is and supplies to the liquid crystal display panel 16 through the light guide plate 14. In other words, the optical sheet 20 reflects polarized light entered from a lateral surface of the light guide plate 14 to supply to the liquid crystal display panel 16 again, thereby implementing an image having enhanced luminance in an image mode. Natural light entered from the lower portion to the light guide plate is passed therethrough as it is, thereby allowing the user to view an object at a rear surface of the liquid crystal display panel 16 in a transparent mode.

Figure 3:
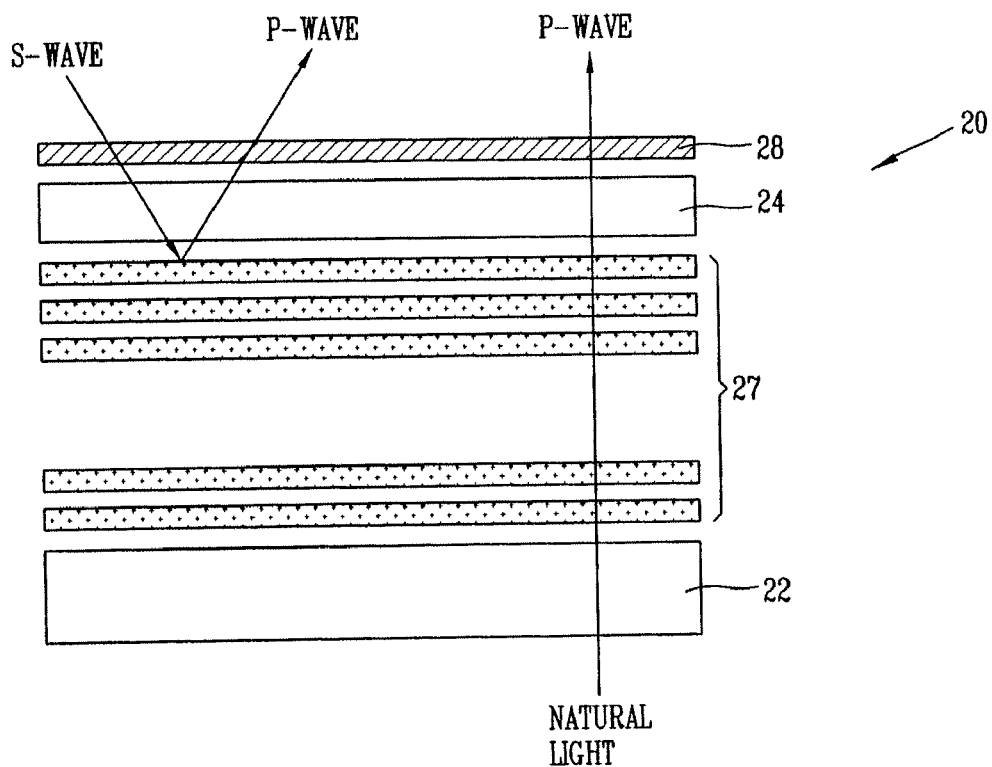
FIG. 3 is a view illustrating the structure of an optical sheet in a transparent display device according to the present invention.

FIG. 3 is a view illustrating the structure of an optical sheet 20 in a transparent display device according to the present invention.

As illustrated in FIG. 3, the optical sheet 20 may include a first base film 22 and a second base film 24, and a polarizing portion 27 formed with several hundred sheets of an isotropic medium and an anisotropic medium having a birefringence characteristic, disposed between the first base film 22 and the second base film 24, to transmit a P-wave component and reflect a S-wave component.

The first base film 22 and the second base film 24 are transparent, and may be formed of polyether (PET), polymethyl methacrylate (PMMA), or poly carbonate (PC), or the like.

The optical sheet 20 having the foregoing structure transmits a P-wave and reflect an S-wave among the incident light.

Hereinafter, driving of a transparent display device with an optical sheet 20 having the foregoing structure will be described in detail with reference to FIGS. 3 and 4.

Figure 4:
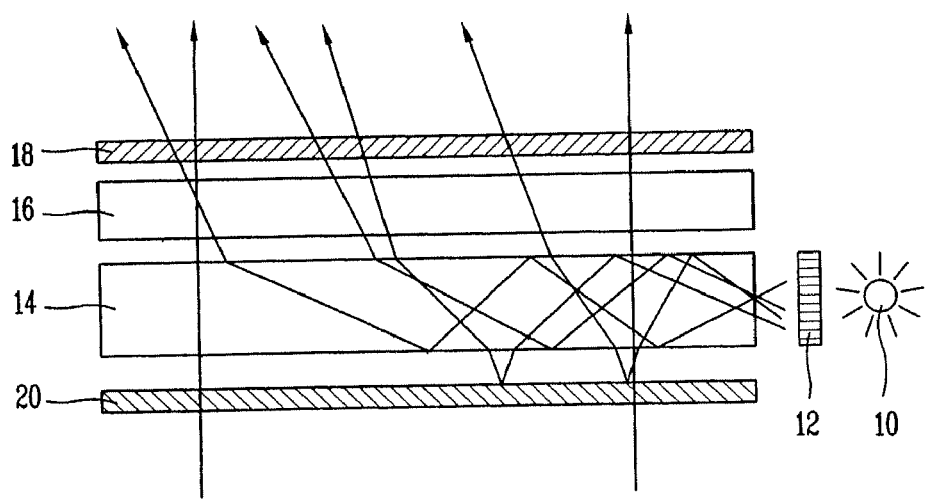
FIG. 4 is a view illustrating the traveling direction of light in a transparent display device according to the present invention.

As illustrated in FIG. 4, light emitted from the light source 10 and passed through the first polarizing plate 12 is polarized and an S-wave is inputted through a lateral surface of the light guide plate 14. The light (i.e., S-wave) entered into one side of the light guide plate 14 is totally reflected inside the light guide plate 14 and traveled to the other side while at the same time being supplied to the liquid crystal display panel 16 through an upper surface of the light guide plate 14.

The S-wave that has not been totally reflected at a lower surface of the light guide plate 14 but refracted into a lower portion of the light guide plate 14 among the S-wave that has been totally reflected inside the light guide plate 14 is entered to the optical sheet 20.

As illustrated in FIG. 3, an S-wave entered from an upper portion of the optical sheet 20 is passed through a diffusion layer 28 and the first base film 24, and then reflected at the polarizing portion 27. As described above, the optical sheet 20 transmits a P-wave and reflects an S-wave, and thus the S-wave entered from an upper portion of the optical sheet 20 is reflected at the polarizing portion 27, and then entered into the light guide plate 14 again. The S-wave totally reflected at the light guide plate 14 and the S-wave reflected at the polarizing portion 27 of the optical sheet 20 are passed through the liquid crystal display panel 16, and then entered into the second polarizing plate 18. At this time, an optical axis of the second polarizing plate 18 is perpendicular to an optical axis of the first polarizing plate 12, and thus only a P-wave is transmitted therethrough and the S-wave is absorbed.

In case where the liquid crystal display device is turned off, i.e., in case where a signal is not applied to the liquid crystal display panel 16, the S-wave totally reflected at the light guide plate 14 and the S-wave reflected at the polarizing portion 27 of the optical sheet 20 is passed through a liquid crystal layer of the liquid crystal display panel 16 as it is, and thus they are not passed through the second polarizing plate 18, thereby displaying black.

In case where the liquid crystal display device is turned on, i.e., in case where a signal is applied to the liquid crystal display panel 16, the S-wave totally reflected at the light guide plate 14 and the S-wave reflected at the polarizing portion 27 of the optical sheet 20 is passed through a liquid crystal layer of the liquid crystal display panel 16 as it is while changing the polarizing state to be a P-wave, and thus they are passed through the second polarizing plate 18, thereby displaying white.

In addition, if the intensity of power applied to the liquid crystal display panel 16 is suitably adjusted, then it may be possible to suitably control the arrangement of liquid crystals in the liquid crystal layer of the liquid crystal display panel 16, thereby adjusting the level of retardation. As a result, the transmissivity of light passing through the liquid crystal layer is controlled at the time of power-on of the liquid crystal display panel 16, thereby displaying grey level.

On the other hand, if natural light supplied to the liquid crystal display panel 16 through the light guide plate 14 at a lower portion of the light guide plate 14 is entered into the optical sheet 20, then a P-wave among the natural light is passed through the polarizing portion 27 but a S-wave is reflected at the polarizing portion 27 and exited to a lower side of the light guide plate 14 again. In case where a signal is not applied to the liquid crystal display panel 16, the P-wave is passed through the light guide plate 14 and supplied to the liquid crystal display panel 16, and then passed through the second polarizing plate 18 as it is, thereby displaying white.

In case where a signal is applied to the liquid crystal display panel 16, light entered into the liquid crystal display panel 16 is passed through a liquid crystal layer while changing the polarizing state to be an S-wave and entered into the second polarizing plate 18, and the S-wave is absorbed in the second polarizing plate 18, thereby displaying black.

Even at this time, the intensity of power applied to the liquid crystal display panel 16 may be suitably adjusted, thereby allowing the user to view an object at the rear surface of the liquid crystal display device with his or her desired grey level.

In this manner, according to the present invention, the S-wave outputted from the light guide plate 14 to the lower portion is reflected at the optical sheet 20 and supplied to the liquid crystal display panel 16 again through the light guide plate 14, and thus light is prevented from being outputted to a lower portion of the light guide plate 14 in an image mode and all light is supplied to the liquid crystal display panel 16, thereby enhancing the luminance of the liquid crystal display panel 16.

According to the present invention, in case of a transparent display device having the optical sheet 20 at a lower portion of the light guide plate 14, it is seen that white brightness is enhanced by about 41% and black brightness is enhanced by about 5% compared to a transparent display device having a structure in which the optical sheet 20 is not disposed, and as a result the contrast ratio is also enhance.

Furthermore, according to the present invention a P-wave among natural light entered to the light guide plate 14 from a lower portion of the light guide plate 14 is passed through the optical sheet 20, and supplied to the liquid crystal display panel 16 through the light guide plate 14, thereby allowing the user to view an object at a rear surface of the liquid crystal display panel 16 in a transparent mode.

Among the natural light entered into the optical sheet 20, a P-wave is transmitted but an S-wave is reflected. In other words, when a transparent display device is viewed from a rear surface of the transparent display device in a transparent mode, the rear surface of the transparent display device has a sleek shape as a mirror by an S-wave reflected from the optical sheet 20, and thus the rear surface of the transparent display device may be used as a mirror.

On the other hand, reflected light and transmitted light are refracted several times in the optical sheet 20 and thus it may be possible to obtain an effect such that light is scattered when light is reflected at the optical sheet 20 or passed through the optical sheet 20. In other words, according to the present invention, light is uniformly supplied to the liquid crystal display panel 16 (i.e., not supplied in a specific viewing angle direction but uniformly supplied in an overall viewing angle direction) by a scattering effect due to the refraction of light, thereby enhancing the viewing angle characteristic of a liquid crystal display device.

In addition, according to the present invention, beads may be distributed on a first base film 28 to amplify the scattering effect thereby scattering light passing through the optical sheet 20, or a diffusion film composed of PMMA, poly-n-butyl methacrylate (PBMA), silica, PC, etc. may be also disposed at an upper portion of the first base film 28 thereby diffusing light passing through the optical sheet 20. Light passing through the optical sheet 20 by such a diffusion film or beads and light reflected at the optical sheet 20 are supplied again to the liquid crystal display panel 16 in a more scattered state, and thus light having a uniform luminance can be supplied to the liquid crystal display panel 16, thereby enhancing the image quality and enhancing a viewing angle characteristic.

As described above, according to the present invention, an optical sheet for transmitting a P-wave and reflecting an S-wave is provided at a lower portion of the transparent display device and thus the S-wave outputted from the light guide plate to a side of the lower portion is reflected in an image mode and supplied to the liquid crystal display panel, thereby enhancing the luminance and contrast of a transparent display device. Furthermore, in a transparent mode, a P-wave is transmitted and an S-wave is reflected among the light entered from a lower portion of the liquid crystal display panel, thereby allowing the user to view an object at the rear surface from the front surface thereof and use the display device as a mirror from the rear surface thereof.

On the other hand, a transparent display device according to the present invention is not merely limited to the transparent display device having a specific structure. For example, though there is disclosed a transparent display device having a structure in which a transparent light guide plate is provided therein and a first polarizing portion is disposed at a lateral surface of the light guide plate allowing first polarized light to be entered into a liquid crystal display panel through the light guide plate in the detailed description, the present invention is not merely limited to the transparent display device having such a structure, and may be also applicable to a transparent display device having any structure. In particular, it may be applicable to a transparent display device having any structure in which an optical sheet for transmitting a P-wave and reflecting an S-wave is provided at a lower portion of the light guide plate.

Moreover, though the optical sheet having a specific structure is disclosed as an optical sheet in the detailed description, the present invention is not merely limited to the optical sheet with such a specific structure. An optical sheet having any structure may be applicable to the present invention if it is possible to reflect light exited from the light guide plate and supply to the liquid crystal display panel again by transmitting light in a specific polarized state and reflecting light in a specific state. For example, an optical sheet having a structure in which a polarizing portion of the optical sheet is comprised of cholesteric liquid crystals to transmit light having a right-hand circular polarized component and reflect light having a left-hand circular polarized component may be also applicable to the present invention.

Furthermore, as illustrated in FIG. 3, a structure having a diffusion film at the upper portion thereof may be used even in case of an optical sheet having a structure in which a polarizing portion is formed of several hundred sheets of an isotropic medium and an anisotropic medium having a birefringence characteristic, but a structure in which the diffusion film is removed may be also used therein.

In other words, other examples or embodiments of a liquid crystal display device using the basic concept of the present invention can be easily contrived by those skilled in the art.

What is claimed is:

1. A transparent display device, comprising:
   a liquid crystal display panel;
   a light source disposed at one side of a lower portion of the liquid crystal display panel to emit light;
   a first polarizing plate for polarizing the light emitted from the light source;
   a light guide plate disposed at a lower portion of the liquid crystal display panel to reflect totally the light polarized in an axis-direction by the first polarizing plate to a lateral surface of the light guide plate to supply the light into the liquid crystal display panel, and transmit natural light entered from a lower direction therethrough;
   a second polarizing plate disposed at an upper portion of the liquid crystal display panel to control the amount of polarized light passing through the liquid crystal display panel; and
   an optical sheet disposed at a lower portion of the light guide plate to change the polarized state of a first polarized light entered from the light guide plate and reflect the light, and transmit a second polarized component entered from the lower portion therethrough.

2. The transparent display device of claim 1, wherein the light source comprises a cathode ray fluorescent lamp or external electrode fluorescent lamp.

3. The transparent display device of claim 1, wherein the light source comprises a light-emitting device (LED).

4. The transparent display device of claim 1, wherein the optical axes of the first polarizing plate and second polarizing plate are perpendicular to each other.

5. The transparent display device of claim 1, wherein the optical sheet comprises:
   a first base film and a second base film; and
   a polarizing portion between the first base film and the second base film to polarize the incident light in a first polarization direction and output the light, and change light having a second polarized component to light having a first polarized component and output the light.

6. The transparent display device of claim 5, wherein the polarizing portion is formed with several hundred sheets of an isotropic medium and an anisotropic medium having a birefringence characteristic to transmit a P-wave component and reflect a S-wave component among the incident light.

7. The transparent display device of claim 1, wherein the air layer includes at least one layer formed over an entire region of the light guide plate.

8. The transparent display device of claim 5, further comprising:
   a diffusion film disposed at an upper portion of the first protective film to diffuse light entered from the polarizing portion.

9. The transparent display device of claim 5, wherein beads are distributed on the first protective film to diffuse light entered from the polarizing portion.

* * * * *